United States Patent
Jeong et al.

(10) Patent No.: US 7,801,560 B2
(45) Date of Patent: Sep. 21, 2010

(54) ACCESSORY APPARATUS FOR MOBILE TERMINAL FOR RECEIVING AND REPRODUCING DMB DATA AND METHOD THEREOF

(75) Inventors: Seong-Han Jeong, Seoul (KR); Ki-Tae Lee, Seoul (KR); Gi-Sok Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 962 days.

(21) Appl. No.: 11/506,126

(22) Filed: Aug. 17, 2006

(65) Prior Publication Data

US 2007/0049333 A1    Mar. 1, 2007

(30) Foreign Application Priority Data

Aug. 31, 2005    (KR) .................. 10-2005-0080864

(51) Int. Cl.
*H04Q 7/32*    (2006.01)
(52) U.S. Cl. ................. 455/557; 455/550.1; 455/575.1; 455/3.01; 455/3.06; 455/3.02; 725/62; 725/63; 725/68; 725/70
(58) Field of Classification Search ............ 455/557, 455/550.1, 575.1, 556.1, 556.2, 569.1, 569.2, 455/90.3, 3.01–3.06, 403, 422.1, 414.1, 414.3, 455/414.4, 500, 517, 566, 412.1, 412.2, 558; 725/62–72, 75
See application file for complete search history.

(56) References Cited

U.S. PATENT DOCUMENTS

| | | | |
|---|---|---|---|
| 6,076,119 A | | 6/2000 | Maemura et al. |
| 2001/0020975 A1* | | 9/2001 | Kerai et al. ............. 348/14.01 |
| 2004/0209649 A1 | | 10/2004 | Lord |
| 2004/0250292 A1 | | 12/2004 | Okamoto et al. |
| 2004/0252965 A1 | | 12/2004 | Moreno et al. |
| 2005/0140790 A1 | | 6/2005 | Min et al. |

FOREIGN PATENT DOCUMENTS

JP    2001-177543    6/2001

(Continued)

OTHER PUBLICATIONS

JP 2004-282459, Toyama, Mobile Imaging, Jul. 10, 2004.*

(Continued)

*Primary Examiner*—Keith T Ferguson
(74) *Attorney, Agent, or Firm*—The Farrell Law Firm, LLP

(57) ABSTRACT

Provided are a method and an accessory apparatus for receiving and reproducing DMB data. The DMB accessory apparatus receives DMB data, converts data formats of the received DMB data into multimedia data formats which can be reproduced by a typical mobile terminal, and transmits the DMB data converted into the mobile terminal reproducible data formats to the mobile terminal. Accordingly, even a mobile terminal, which does not have a function of receiving and reproducing DMB data, can reproduce the DMB data.

8 Claims, 7 Drawing Sheets

FOREIGN PATENT DOCUMENTS

| | | |
|---|---|---|
| JP | 2003-158561 | 5/2003 |
| JP | 2003-208395 | 7/2003 |
| JP | 2004/282459 | 10/2004 |
| JP | 1020050063221 | 6/2005 |
| JP | 2006-511901 | 4/2006 |
| KR | 1020000058798 | 10/2000 |
| KR | 1020050000780 | 1/2005 |
| RU | 2004139098/09 | 6/2003 |
| WO | WO 03/103212 | 12/2003 |
| WO | WO 2004/055655 | 7/2004 |
| WO | WO 2004/112268 | 12/2004 |

OTHER PUBLICATIONS

WO 2004/112268 A1, Kim, Apparatus for supplying multimedia data processing, Dec. 23, 2004.*

A. Depari, et al., USB Sensor Network for Industrial Applications, 2004.

IBM Technical Disclosure Bulletin, Bus Expansion for Chip Card, XP 000694516, vol. 40 No. 3, Mar. 1997.

* cited by examiner

ACCESSORY APPARATUS FOR MOBILE TERMINAL FOR RECEIVING AND REPRODUCING DMB DATA AND METHOD THEREOF

PRIORITY

This application claims priority under 35 U.S.C. §119 to an application entitled "Accessory Apparatus of Mobile Terminal for Receiving and Reproducing DMB Data and Method Thereof" filed in the Korean Intellectual Property Office on Aug. 31, 2005 and assigned Serial No. 2005-80864, the contents of which are incorporated herein by reference.

BACKGROUND OF THE INVENTION

1. Field of the Invention

The present invention relates generally to an accessory apparatus of a mobile terminal, and in particular, to an accessory apparatus for receiving digital multimedia broadcasting (DMB) data.

2. Description of the Related Art

In general, digital multimedia broadcasting (DMB) is a service that provides high image and sound quality, and improved service to users by replacing conventional analog broadcasting. Recently, as the digital broadcasting and mobile communication technologies have evolved, users have become increasingly interested in digital broadcasting service for watching a digital broadcasting program while in motion. Thus, at present, an omni-directional DMB receive antenna is installed in a mobile terminal, and DMB data can be received using such a mobile terminal (hereinafter DMB receiving terminal).

Therefore, in order to receive DMB data, a typical mobile terminal must include a DMB receiving unit and a DMB module for decoding and reproducing the received DMB data. However, since the typical mobile terminal does not include these components, a user cannot watch a DMB program using the typical mobile terminal.

Mobile terminals currently on the market, such as mobile phones and Personal Digital Assistants (PDAs), have an accessory interface. An accessory is a peripheral device, such as an ear-mike or an earphone jack, which can be used while connected to a mobile terminal. The accessory interface is an interface of a mobile terminal through which the accessory can be connected to the mobile terminal. Thus, a user can use a mobile terminal in various manners by connecting various accessory apparatuses to the mobile terminal through the accessory interface.

Consider the connection of an accessory apparatus, including the DMB receiving unit for receiving DMB data and the DMB module for decoding and reproducing the received DMB data, to the accessory interface of the mobile terminal. In this case, in order for the accessory apparatus to receive and reproduce DMB data, the accessory apparatus must control the mobile terminal so that the received DMB data can be reproduced in the mobile terminal after receiving the DMB data. Thus, the accessory apparatus must have a function of operating as a host device of the mobile terminal, and the mobile terminal must recognize the, accessory apparatus as the host device.

However, a general accessory, such as an ear jack or a microphone, is only used to receive an audio signal output from a mobile terminal or input a voice signal to the mobile terminal through the microphone. An accessory apparatus, such as an external DMB antenna, only has a passive function of receiving DMB data in response to a control of a DMB receiving terminal and transmitting the received DMB data to the DMB receiving terminal.

An accessory interface of a general mobile terminal has terminals for data input/output signals, power and ground, and does not have a terminal, such as a V Bus terminal of a 24-pin interface, for receiving a voltage from a connected peripheral device and recognizing the peripheral device as a host or a slave.

Thus, the accessory interface of the general mobile terminal cannot recognize a connected peripheral device as a host. This is because in a method of recognizing a peripheral device as a host, which is used in the general mobile terminal, when a peripheral device, such as a personal computer having a host function, is connected to the mobile terminal, the peripheral device applies a voltage to a V Bus terminal of the mobile terminal. Then, the mobile terminal recognizes the peripheral device as a host using the voltage input through the V Bus terminal.

The mobile terminal recognizes the peripheral device as a host according to logical states of data terminals used to exchange data with the peripheral device. If the mobile terminal is connected to the peripheral device through the 24-pin interface including the V Bus terminal, the mobile terminal applies the voltage input through the V Bus terminal to any one of data terminals not used to exchange data with the peripheral device. Then, the mobile terminal recognizes the connected peripheral device as a host only if all the data terminals are logically high.

Thus, the general mobile terminal, which does not have the V Bus terminal, cannot recognize a device connected through the accessory interface as a host.

SUMMARY OF THE INVENTION

An object of the present invention is to substantially solve at least the above problems and/or disadvantages and to provide at least the advantages below. Accordingly, an object of the present invention is to provide an accessory apparatus for receiving and decoding digital multimedia broadcasting (DMB) data (hereinafter DMB accessory apparatus) and a method of reproducing the DMB data using the DMB accessory apparatus.

According to the present invention, there is provided a DMB receiving apparatus, including a DMB accessory apparatus allowing a mobile terminal to reproduce DMB data by receiving the DMB data, applying a specific voltage through a pull-up resistor to any one of data transmission terminals of an accessory interface, converting a data format of the DMB data into a mobile terminal reproducible data format, and transmitting the converted DMB data to the mobile terminal.

According to the present invention, there is provided a method for a DMB accessory apparatus to receive DMB data and allow a mobile terminal to reproduce the received DMB data, including applying, by the DMB accessory apparatus, a specific voltage through a pull-up resistor to any one terminal, which is not used to exchange data with the mobile terminal, among terminals of an interface of the DMB accessory apparatus, which are matched with terminals of the accessory interface of the mobile terminal, converting the DMB data according to a multimedia data format which can be reproduced by the mobile terminal, and outputting the converted DMB data to the mobile terminal and controlling the mobile terminal to reproduce the converted DMB data.

According to the present invention, there is provided a method for a mobile terminal to reproduce DMB data through a DMB accessory apparatus, including checking logical states of data terminals of an accessory interface, recognizing the DMB accessory apparatus as a host device according to the data terminal checking result, and reproducing the DMB data input from the DMB accessory apparatus.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

Figure 1A:
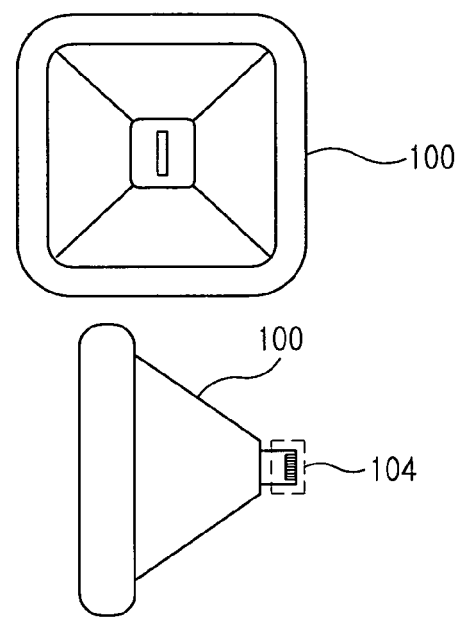
FIG. 1 shows a plan view and a front view of a DMB accessory apparatus according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail, for the sake of clarity and conciseness.

In the present invention, a DMB accessory apparatus for receiving DMB data, converting a data format of the received DMB data into a data format which can be reproduced by a mobile terminal, and transmitting the converted DMB data to the mobile terminal, applies a specific voltage through a pull-up resistor to a data terminal currently not used for data transmission. Then, the mobile terminal recognizes the DMB accessory apparatus as a host by recognizing logical states of data terminals as high using the specific voltage. Thereafter, the DMB accessory apparatus controls the mobile terminal to reproduce the converted DMB data.

Figure 1B:
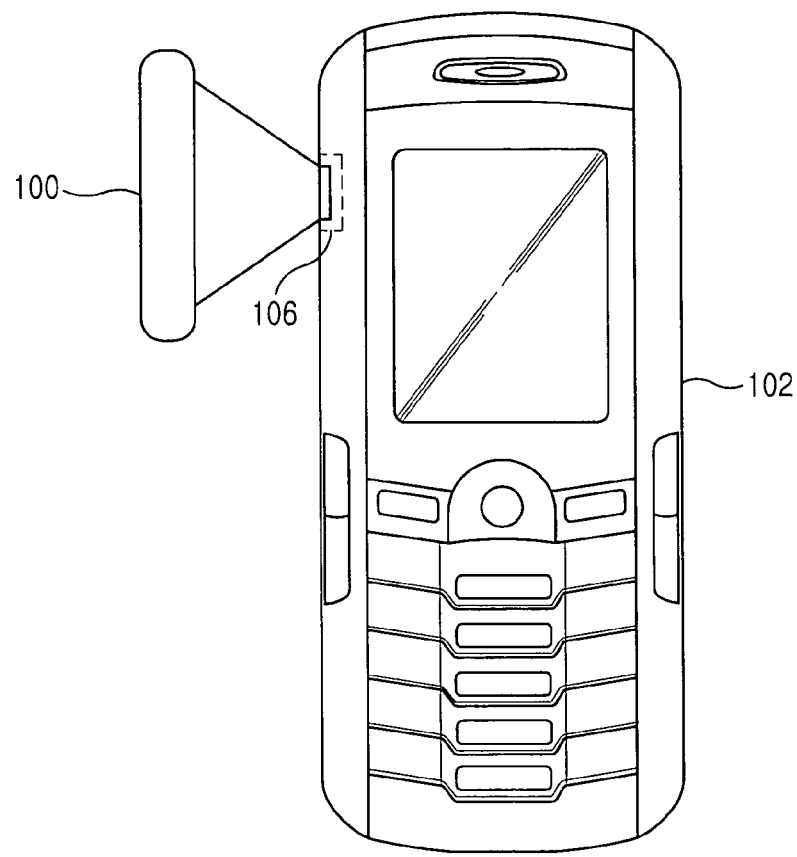

FIG. 1A illustrates a DMB accessory apparatus 100 according to the present invention, and FIG. 1B shows an illustration of the DMB accessory apparatus 100 matched with a mobile terminal 102.

Referring to FIG. 1A, the DMB accessory apparatus 100 includes a DMB accessory interface 104. The DMB accessory apparatus 100 can be connected to the mobile terminal 102 as illustrated in FIG. 11B by matching the DMB accessory interface 104 with a terminal accessory interface 106 of the mobile terminal 102.

In FIG. 1, the mobile terminal 102 is illustrated as, but is not limited to, a mobile phone. The mobile terminal 102 can include all devices, which can reproduce a moving picture, such as a mobile phone illustrated in FIG. 1, a personal digital assistant (PDA) and a digital camcorder. Such mobile terminals have at least one video data format and at least one audio data format for reproducing the moving picture. In addition, the mobile terminal 102 includes a universal serial bus (USB) or universal asynchronous receiver/transmitter (UART) controller (not shown) for controlling an interface with a connected device according to the use of a USB or UART scheme. Hereinafter, a component, such as the USB or UART controller, for controlling an interface is called an interface controller. In general, the terminal accessory interface 106 is connected to the interface controller. The mobile terminal 102 controls the interface controller to input/output data from/to a device connected through the accessory interface 106. The terminal accessory interface 106 includes interface terminals for exchanging various types of data, such as a microphone signal and an audio signal, inputting a remote key, and outputting a television (TV)-OUT signal.

Figure 2:
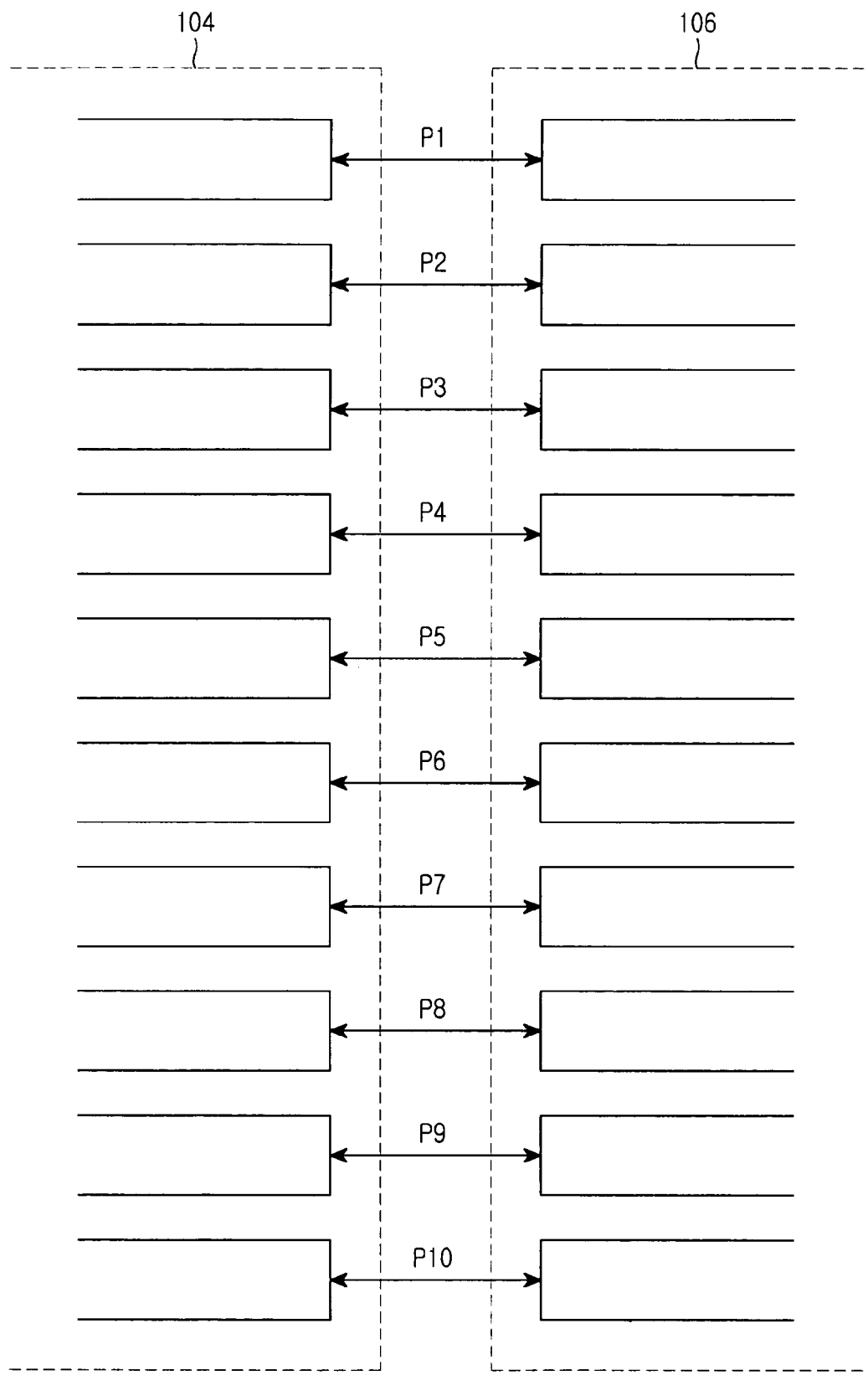
FIG. 2 is a schematic diagram of terminals of an accessory interface of a mobile terminal, which are matched with terminals of a DMB accessory interface of a DMB accessory apparatus according to the present invention.

FIG. 2 is a schematic diagram of terminals of the terminal accessory interface 106 of the mobile terminal 102, which are connected with terminals of the DMB accessory interface 104 of the DMB accessory apparatus 100 according to the present invention.

Referring to FIG. 2, each of the DMB accessory interface 104 of the DMB accessory apparatus 100 and the terminal accessory interface 106 of the mobile terminal 102 has 10 terminals connected with each other. Since the number of the terminals of the terminal accessory interface 106 is generally 10, 10 terminals are illustrated for the sake of convenience.

In general, for the terminal accessory interface 106, an exchanged signal and a function are set to each of the 10 terminals. The functions of the 10 terminals are shown in Table 1.

TABLE 1

| Terminal | Function |
| --- | --- |
| P1 | GND (ground terminal) |
| P2 | MIC+ |
| P3 | MIC– or GND |
| P4 | R_CH audio signal |
| P5 | L_CH audio signal |
| P6 | USB D+ |
| P7 | USB D– |
| P8 | Insert |
| P9 | A type |
| P10 | PWR (power) |

In Table 1, the terminal P1 is a ground terminal, and the terminal P2 is used as an input terminal of a microphone signal. The terminal P3 is an input terminal of a microphone signal in a dual audio method or a ground terminal. The terminals P4 and P5 are used as an output terminal of an audio signal of a right channel (R_CH) and an output terminal of an audio signal of a left channel (L_CH), respectively. The terminal P8 has a function of sensing that a specific accessory apparatus is connected to the terminal accessory interface 106 and informing the mobile terminal of the sensing result. The terminal P9 is used as a terminal for recognizing a type of the DMB accessory interface 104 when the DMB accessory interface 104 is connected. The terminal P10 is used as a power supply terminal for supplying power to the DMB accessory apparatus 100 connected to the terminal accessory interface 106.

The terminals P6 and P7 can be arbitrarily used. At the present, the terminal P6 may be used as a key signal input terminal for inputting a key signal input to the mobile terminal 102, and the terminal P7 is used as a TV-OUT terminal for outputting a signal of the mobile terminal 102 to a TV. In addition, the terminals P6 and P7 may be used for exchanging data, i.e., the terminal P6 as a USB D+ terminal (hereinafter D+ terminal) and the terminal P7 as a USB D− terminal (hereinafter D− terminal). The D+ terminal is generally used to transmit data at a high speed (about 12 Mbps), and the D− terminal is generally used to transmit data at a low speed (about 1.5 Mbps). Only one of the data terminals P6 and P7 is used according to an exchanging method used to exchange data, i.e., according to high or low speed data transmission.

It is assumed that the DMB accessory apparatus 100 according to the present invention uses the terminal P6 as the D+ terminal and the terminal P7 as the D− terminal when power is on. The DMB accessory apparatus 100 applies a specific voltage through a pull-up resistor to any one of the terminals P6 and P7, which is not used for data transmission. By doing this, the DMB accessory apparatus 100 can maintain both the data terminals P6 and P7 at a logical high state. Thus, the mobile terminal 102 can recognize the DMB accessory apparatus 100 connected to the terminal accessory interface 106 as a host.

Although FIG. 2 illustrates that the terminal accessory interface 106 has 10 terminals, the number of the terminals of the terminal accessory interface 106 is not limited to 10. For example, even when the terminal accessory interface 106 uses more than 11 terminals, if a terminal, such as the V Bus terminal, for applying a voltage to the interface controller to recognize an accessory apparatus as a host is not included in the increased terminals as the example of the 24-pin interface, the accessory apparatus can be recognized as a host using a method according to the present invention.

Figure 3A:
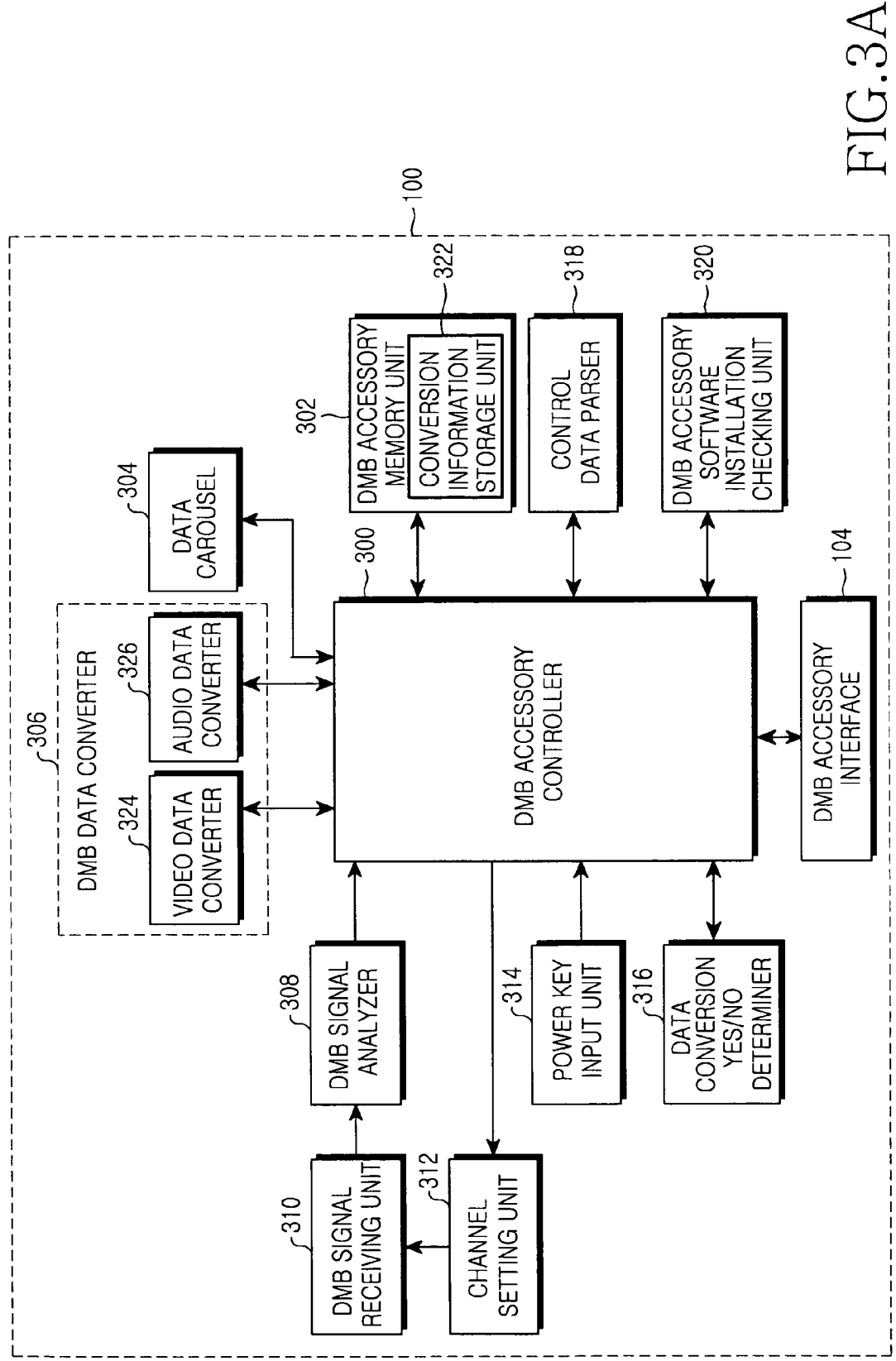
FIG. 3A is a block diagram of a DMB accessory apparatus according to the present invention.

FIG. 3A is a block diagram of the DMB accessory apparatus 100 according to the present invention. Referring to FIG. 3A, the DMB accessory apparatus 100 includes a DMB accessory memory unit 302, a DMB signal analyzer 308, a DMB data converter 306, a data conversion yes/no determiner 316, a power key input unit 314, the DMB accessory interface 104, a control data parser 318, a DMB accessory software installation checking unit 320, and a channel setting unit 312, which are connected to a DMB accessory controller 300.

The DMB accessory interface 104 connected to the DMB accessory controller 300 interfaces the DMB accessory controller 300 and a controller of the mobile terminal 102. When a power on/off key of the power key input unit 314 is on, the DMB accessory controller 300 performs a host setting process of the DMB accessory apparatus 100 through the DMB accessory interface 104. As illustrated in FIG. 2, the host setting process of the DMB accessory apparatus 100 is a process of maintaining both the D+ and D− terminals of the terminal accessory interface 106 at the logical high state by applying a specific voltage through a pull-up resistor to any one of the D+ and D− terminals, which is not used for data transmission, so that the mobile terminal 102 can recognize the DMB accessory apparatus 100 as a host.

If the DMB accessory apparatus 100 is set as a host, the DMB accessory controller 300 controls every component of the DMB accessory apparatus 100 and the connected mobile terminal 102 using the controller of the mobile terminal 102. The DMB accessory apparatus 100 determines whether DMB accessory software that allows the mobile terminal 102 to parse broadcasting program information per channel, i.e., electronic program guide (EPG) data, of DMB, which is included in the DMB data, and output the EPG data as image information, is installed in the mobile terminal 102. When the DMB accessory software is not installed in the mobile terminal 102, the DMB accessory controller 300 may inform a user of this determination, or may directly install the DMB accessory software in the mobile terminal 102.

The DMB accessory software checks multimedia data formats, which can be supported by the mobile terminal 102, according to the present invention. If video and audio data included in DMB data are received from the DMB signal analyzer 308, the DMB accessory controller 300 converts data formats of the received video and audio data into video and audio data formats, which can be reproduced by the mobile terminal 102, and transmits the video and audio data converted into the data formats, which can be reproduced and output by the mobile terminal 102, to the mobile terminal 102.

If information data is received from the DMB signal analyzer 308, the DMB accessory controller 300 provides the received information data to the a data carousel 304, outputs information data selected through the data carousel 304 by the user to the mobile terminal 102, and controls the mobile terminal 102 to display the information data as image information. Then, the mobile terminal 102 can reproduce the video and audio data of the DMB data or output the information data as the image information.

If control data is received from the DMB signal analyzer 308, the DMB accessory controller 300 outputs the received control data to the control data parser 318 and controls the control data parser 318 to parse the control data. Then, the DMB accessory controller 300 generates DMB channel configuration information using the parsed control data and outputs the generated channel configuration information to the channel setting unit 312. The channel configuration information is information on code division multiplexing (CDM) channels allocated to broadcasting channels, such as CDM channel information of satellite DMB.

If broadcasting program information per channel of DMB is received from the DMB signal analyzer 308, the DMB accessory controller 300 outputs the received broadcasting program information per channel to the mobile terminal 102. If the user selects a key for outputting EPG data, the DMB accessory controller 300 controls the mobile terminal 102 to parse the broadcasting program information per channel. Then, the mobile terminal 102 parses the broadcasting program information per channel using pre-installed DMB accessory software in response to a control of the DMB accessory controller 300. Thereafter, the mobile terminal 102 outputs the parsed broadcasting program information per channel as image information. Thus, the mobile terminal 102 can provide information on channels of the DMB data to the user as image information.

A DMB signal-receiving unit 310 includes an antenna (not shown) for receiving DMB data, a radio frequency (RF) unit (not shown), and a baseband processing unit (not shown). The DMB signal-receiving unit 310 receives DMB data according to a channel set by the channel setting unit 312 and outputs the received DMB data to the DMB signal analyzer 308.

The DMB signal analyzer 308 connected to the DMB accessory controller 300 extracts video data, audio data, information data, control data, and broadcasting program information per channel by analyzing the DMB data received from the DMB signal receiving unit 310, and outputs the extracted video data, audio data, information data, control data, and broadcasting program information per channel to the DMB accessory controller 300.

The control data parser 318 parses the control data including program specification information (PSI), such as a service description table (SDT), a program association table (PAT), and a program map table (PMT), input from the DMB accessory controller 300, and outputs the parsed control data to the DMB accessory controller 300. Then, the DMB accessory controller 300 outputs the parsed control data to the channel setting unit 312 as channel configuration information.

The channel setting unit 312 confirms a configuration of DMB channels using the channel configuration information generated by the control data parser 318. If a key for channel selection is selected by the user, the DMB accessory controller 300 controls the channel setting unit 312 to set a channel according to the key for channel selection, which is selected by the user, into the DMB signal receiving unit 310.

A method of setting a channel in the channel setting unit 312 can vary according to a type of DMB received by the DMB accessory apparatus 100. That is, for example, if the DMB accessory apparatus 100 receives a satellite DMB program, the channel setting unit 312 may set a channel by generating a Walsh code map using the channel configuration information input from the DMB accessory controller 300, selecting a Walsh code according to the channel set by the user, and outputting the selected Walsh code to the DMB signal receiving unit 310 to set the selected Walsh code into the DMB signal receiving unit 310. If the DMB accessory apparatus 100 receives a terrestrial DMB program, the channel setting unit 312 may set a channel by outputting an Ensemble frequency selected by the user into the DMB signal-receiving unit 310.

The DMB accessory software installation-checking unit 320 connected to the DMB accessory controller 300 determines whether DMB accessory software is installed in the mobile terminal 102 in response to a control of the DMB accessory controller 300. The DMB accessory software allows the mobile terminal 102 to recognize the DMB accessory apparatus 100, transmit a key input signal to the DMB accessory apparatus 100, receive converted video and audio data from the DMB accessory apparatus 100, and output information data and parsed EPG data as image information.

The DMB accessory controller 300 informs the user whether the DMB accessory software is installed in the mobile terminal 102. The DMB accessory apparatus 100 can inform the user of the determination result through image information using a display unit of the mobile terminal 102. In this case, the user can download the DMB accessory software by accessing a wireless network in a case where the mobile terminal 102 can access the wireless network or accessing a device such as a personal computer (PC).

The DMB accessory software installation-checking unit 320 may have installation data of the DMB accessory software. In this case, if it is determined that the DMB accessory software is not installed in the mobile terminal 102, the DMB accessory controller 300 may install the DMB accessory software in the mobile terminal 102 using the installation data of the DMB accessory software prepared in the DMB accessory software installation checking unit 320.

The DMB accessory memory unit 302 connected to the DMB accessory controller 300 includes a Read Only Memory (ROM), a flash memory and a Random Access Memory (RAM). The ROM stores programs and various types of reference data for processing and control of the DMB accessory controller 300. The RAM provides a working memory space of the DMB accessory controller 300, and the flash memory provides a space for storing various types of updatable storage data. In addition, when information on reproducible multimedia data formats is received from the mobile terminal 102, the DMB accessory controller 300 stores the received information in the flash memory.

When DMB data is received, the DMB accessory memory unit 302 stores conversion information used to convert data formats of multimedia data included in the received DMB data into the mobile terminal reproducible data formats. Herein, an area of the DMB accessory memory unit 302 in which the conversion information is stored is called a conversion information storage unit 322.

The DMB accessory controller 300 controls the DMB data converter 306 connected to the DMB accessory controller 300 to convert one or both of data formats of the video data and the audio data of the received DMB data into a data format, which can be reproduced and output by the mobile terminal 102. To do this, the DMB data converter 306 includes at least one of a video data converter 324 and an audio data converter 326.

The video data converter 324 converts a data format of the video data of the DMB data into a video data format, which can be reproduced by the mobile terminal 102. For example, in a case where DMB is satellite DMB and the mobile terminal 102 supports only an MPEG-4 data format, the video data of the DMB data has an MPEG-4 AVC (Advanced Video Coding, H.264/MPEG-4 part-10) data format (hereinafter H.264 data format) according to a satellite DMB standard. Then, the video data converter 324 converts the video data according to the H.264 data format into video data according to the MPEG-4 data format, using the conversion information stored in the conversion information storage unit 322. The DMB accessory controller 300 outputs the video data converted into the MPEG-4 data format to the mobile terminal 102. Thus, the mobile terminal 102 can reproduce the video data of the DMB data. However, if the mobile terminal 102 can reproduce video data according to the H.264 data format, the video data converter 324 may not perform the video data format conversion. In this case, the video data converter 324 may not be included. Although the above-description is related to satellite DMB, the current embodiment also can be applied to terrestrial DMB using the H.264 data format.

The above-description is almost the same as the case of the audio data converter 326. For example, in a case where DMB is satellite DMB and the mobile terminal 102 supports only an audio data format different from that according to the satellite DMB standard, the audio data of the DMB data has an MPEG-2 AAC+ (Advanced Audio Codec) SER (Spectral Band Replication) data format (hereinafter AAC+ data format) according to the satellite DMB standard. Then, the audio data converter 326 converts the audio data according to the AAC+ data format into audio data according to the mobile terminal reproducible data format. The DMB accessory controller 300 outputs the converted audio data to the mobile terminal 102 and controls the mobile terminal 102 to reproduce the audio data of the DMB data. However, if the mobile terminal 102 can reproduce audio data according to the AAC+ data format, the audio data converter 326 may not perform the audio data format conversion. Accordingly, if a typical mobile terminal can reproduce audio data according to the AAC+ data format, the audio data converter 326 may not be included.

In the above-described case, since satellite DMB is illustrated as DMB, the AAC+ data format, which is an audio data format according to the satellite DMB standard, has been described. However, audio data of the AAC+ data format can be reproduced by a typical mobile phone. That is, when the DMB accessory apparatus 100 receives a satellite DMB program, if the mobile terminal 102 is a mobile phone, the audio data converter 326 may not be necessary.

However, if DMB is terrestrial DMB, audio data of an MPEG-4 BSAC (Bit Sliced Arithmetic Coding) data format (hereinafter, a BSAC data format) according to a terrestrial DMB standard is received. In this case, a current typical mobile phone cannot reproduce the audio data of the BSAC data format. Thus, in this case, the audio data converter 326 converts the audio data of the BSAC data format into audio data of the AAC+ data format, thereby allowing the current typical mobile phone to reproduce the audio data according to the terrestrial DMB standard.

If information data is included in DMB data according to a channel selected by the user, the information data is transmitted form the DMB signal analyzer 308 to the data carousel 304 by a control of the DMB accessory controller 300. Then, the data carousel 304 receives the information data. If the user selects a key for outputting information data, the DMB accessory controller 300 controls the data carousel 304 to output the information data of the DMB channel selected by the user to the mobile terminal 102. Then, the mobile terminal 102 outputs the information data as image information using the DMB accessory software. Accordingly, the DMB accessory apparatus 100 can provide not only multimedia data of DMB data, but also information data to the user.

The DMB accessory controller 300 controls the data conversion yes/no determiner 316 connected to the DMB accessory controller 300 to request the mobile terminal 102 for information on video and audio data formats, which can be reproduced by the mobile terminal 102. If the data format information is received from the mobile terminal 102, the data conversion yes/no determiner 316 compares the data format information received from the mobile terminal 102 to the conversion information stored in the DMB accessory memory unit 302. Then, the data conversion yes/no determiner 316 determines whether the DMB data can be converted according to multimedia data formats supported by the mobile terminal 102. According to the determination result, the data conversion yes/no determiner 316 determines data formats to be used to convert the DMB data.

Figure 3B:
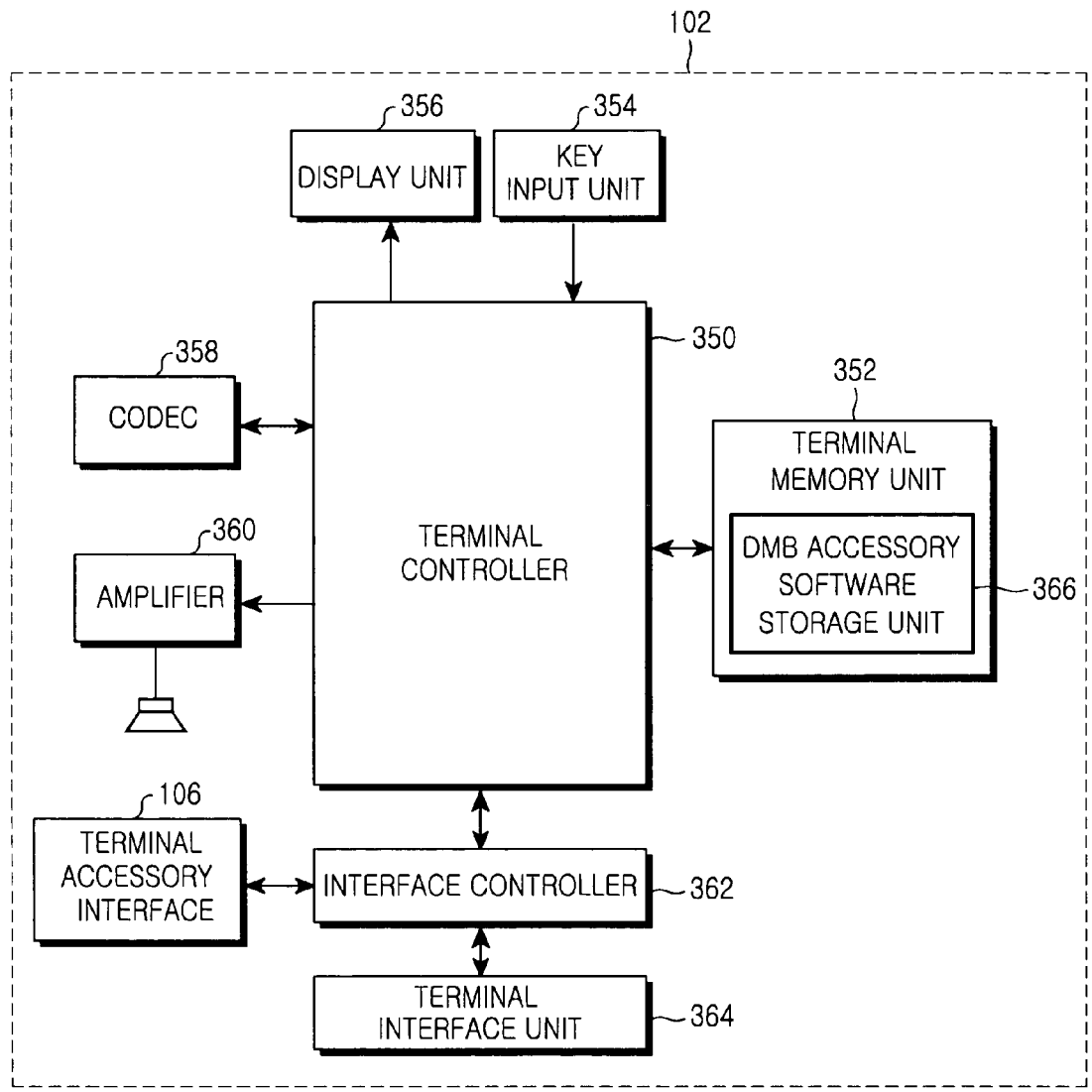
FIG. 3B is a block diagram of a typical mobile terminal connected to a DMB accessory apparatus according to the present invention.

FIG. 3B is a block diagram of the mobile terminal 102 connected to the DMB accessory apparatus 100 according to the present invention. The mobile terminal 102 is one of a typical PDA, a typical mobile phone, and a typical laptop computer. However, the mobile terminal 102 needs a display unit, such as a liquid crystal display (LCD) display device, for reproducing format converted video data of DMB data, a key input unit for transmitting a key input signal for selecting a channel and receiving the DMB data to the DMB accessory apparatus 100, and an audible sound output unit, e.g., a speaker, for outputting an audible sound signal by reproducing audio data input from the DMB accessory apparatus 100.

Referring to FIG. 3B, the mobile terminal 102 connected to the DMB accessory apparatus 100 includes an interface controller 362, a terminal memory unit 352, a key input unit 354, a display unit 356, a codec 358, and an amplifier 360, which are connected to a terminal controller 350.

The interface controller 362 is connected to the terminal controller 350 and controls the terminal accessory interface 106 and a terminal interface unit 364, which can be connected with the DMB accessory interface 104. The interface controller 362 sets a peripheral device connected through the terminal accessory interface 106 or the terminal interface unit 364 and the mobile terminal 102 as a host or a slave, and inputs/outputs data or video and audio signals from/to the peripheral device.

The terminal accessory interface 106 generally has 10 terminals and interfaces with a typical accessory apparatus. The terminal interface unit 364 is generally a 24-pin interface having 24 terminals and interfaces a device, such as a PC, with the mobile terminal 102 by being connected with the device. The terminal controller 350 controls the display unit 356 to display received data as image information.

The terminal controller 350 controls every component of the mobile terminal 102. The terminal controller 350 receives a key input signal from the key input unit 354 and outputs the received key input signal to the DMB accessory apparatus 100. The terminal controller 350 also decodes video data and audio data input from the DMB accessory apparatus 100 using the codec 358 and outputs the decoded audio and video data through the amplifier 164 and a speaker and the display unit 356 in response to a control of the DMB accessory controller 300.

If the user wants to see information data, the terminal controller 350 outputs information data received from the DMB accessory apparatus 100 as image information using pre-stored DMB accessory software. If the user wants to see EPG data, the terminal controller 350 receives broadcasting program information per channel of DMB from the DMB accessory apparatus 100, parses the received broadcasting program information per channel using the stored DMB accessory software, and outputs the parsed broadcasting program information per channel as image information using the stored DMB accessory software according to a control of the DMB accessory controller 300. The DMB accessory software may be installed in the mobile terminal 102 by receiving installation data of the DMB accessory software from the DMB accessory apparatus 100, or may be downloaded from a wireless network, such as a mobile communication network, or a server of a selected service provider.

The terminal memory unit 352 connected to the terminal controller 350 includes a ROM, a flash memory and a RAM. The ROM stores programs and various types of reference data for processing and controls of the terminal controller 350. The RAM provides a working memory space of the terminal controller 350, and the flash memory provides a space for storing various types of updatable storage data. In addition, the terminal memory unit 352 of the mobile terminal 102 has an area in which the DMB accessory software provided by the DMB accessory apparatus 100, the wireless network, or the service provider is stored. Hereinafter, the area of the terminal memory unit 352 in which the DMB accessory software is stored is called a DMB accessory software storage unit 366.

The codec 358 decodes video and audio signals input from the terminal controller 350 and outputs the decoded video and audio signals back to the terminal controller 350. The key input unit 354 includes various keys including numeric keys as described above, and provides a key input signal corresponding to a key selected by the user to the terminal controller 350. The amplifier 360 connected to the terminal controller 350 is connected to the speaker and outputs audio data input from the terminal controller 350 to the speaker. The amplifier 360 also amplifies a voice signal output to the speaker and controls the volume of the speaker in response to a control of the terminal controller 350.

Thus, if the user uses the DMB accessory apparatus 100 according to the present invention, the user can watch a DMB program using even the mobile terminal 102, which does not have a DMB function, such as a typical mobile phone, a typical PDA, or a typical laptop computer. In this case, the user can select a desired channel using the key input unit 354 of the mobile terminal 102. In addition, the user can select to display EPG data or information data of DMB data using the key input unit 354.

Figure 4:
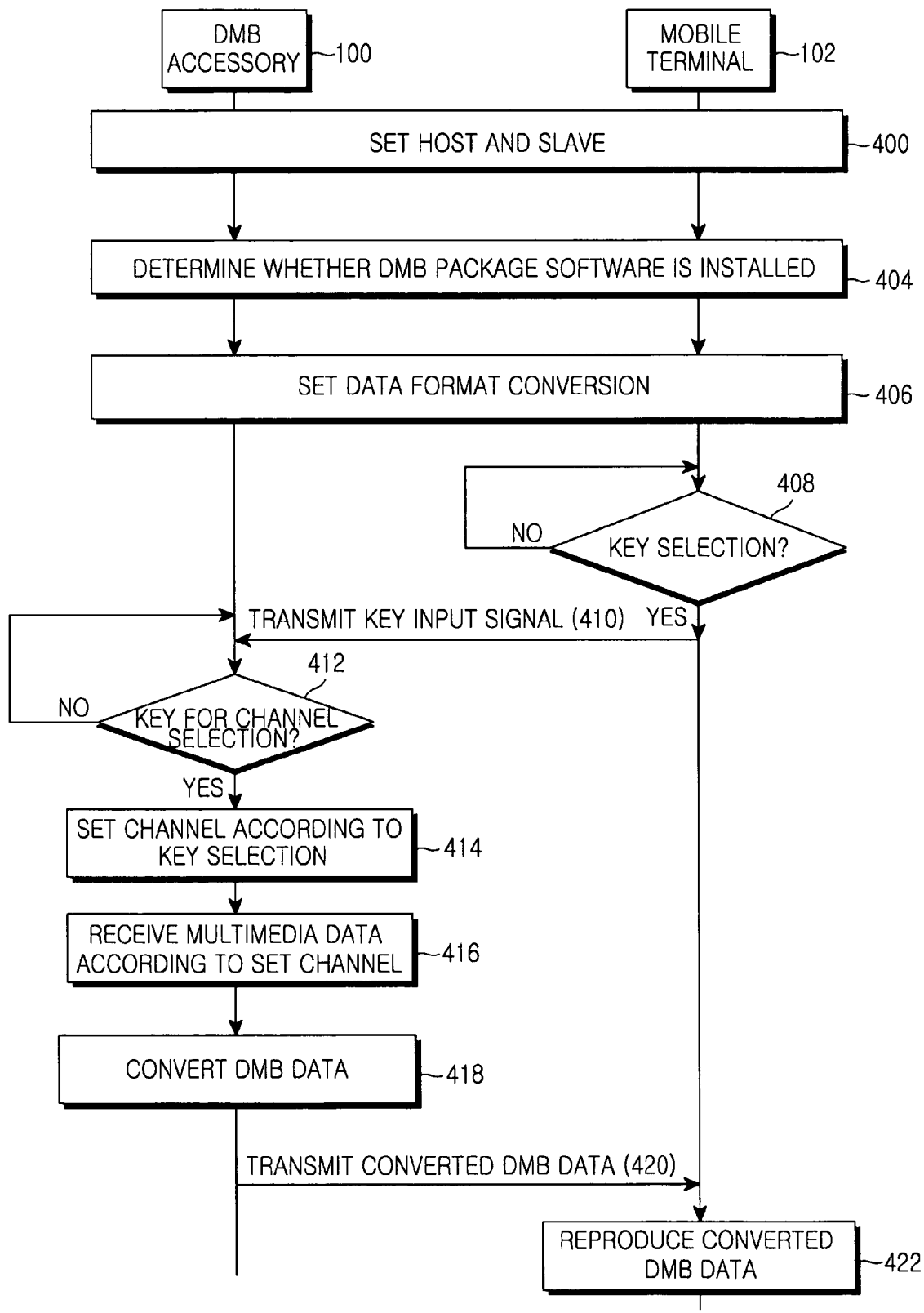
FIG. 4 is a signaling diagram illustrating an operation of reproducing DMB data in a typical mobile terminal using a DMB accessory apparatus according to the present invention.

FIG. 4 is a signaling diagram illustrating an operation of reproducing DMB data in the typical mobile terminal 102 using the DMB accessory apparatus 100 according to the present invention. It is assumed that a mobile phone that can support the AAC+ audio data format and the MPEG-4 video data format is used as the mobile terminal 102. In addition, it is assumed that DMB is satellite DMB using the H.264 video data format and the AAC+ audio data format.

Referring to FIG. 4, when an operation on key signal is input from the power key input unit 314, in step 400, the DMB accessory controller 300 applies a specific voltage through a pull-up resistor to a specific terminal, e.g., one of the D+ and D− terminals, which is not used for data transmission. Then, the mobile terminal 102 sets the DMB accessory apparatus 100 as a host and sets itself as a slave.

In step 404, the DMB accessory apparatus 100 determines whether the DMB accessory software is installed in the mobile terminal 102. Then, the DMB accessory apparatus 100 informs the user of the determination result. If the DMB accessory apparatus 100 can install the DMB accessory software in the mobile terminal 102, and when it is determined that the DMB accessory software is not installed in the mobile terminal 102, the DMB accessory apparatus 100 may install the DMB accessory software in the mobile terminal 102.

After the DMB accessory software is installed in the mobile terminal 102, in step 406, the DMB accessory apparatus 100 requests the mobile terminal 102 for information on multimedia data formats supported by the mobile terminal 102 and sets data format conversion of the DMB data converter 306 according to the multimedia data formats supported by the mobile terminal 102. Since it is assumed that the mobile phone supports the MPEG-4 and AAC+ data formats, the data format conversion is set to convert a data format of video data into the MPEG-4 data format and not to convert audio data.

The DMB accessory apparatus 100 may have various methods of setting the data format conversion according to the mobile terminal 102. For example, the DMB accessory apparatus 100 may determine supportable multimedia data formats according to a model of the mobile terminal 102 by receiving unique information of the mobile terminal 102 from the terminal controller 350, or directly request the mobile terminal for data format information of reproducible multimedia data. In addition, the user may directly designate data formats to be converted by the DMB accessory apparatus 100 through a key operation, or the DMB accessory apparatus 100 may directly convert DMB data received according to pre-set data formats into specific data formats.

When the data format conversion is set in step 406, in step 408, the mobile terminal 102 determines whether a key is selected by the user. If a key is selected by the user, in step 410, the mobile terminal 102 transmits a key input signal corresponding to the selected key to the DMB accessory apparatus 100 through the interfaces 104 and 106 connected with each other. Herein, the key input signal of the mobile terminal 102 may be converted to a signal, which can be recognized by the DMB accessory apparatus 100, by the DMB accessory software installed in the mobile terminal 102 and transmitted to the DMB accessory apparatus 100.

In step 412, the DMB accessory apparatus 100 receives the key input signal and determines whether the received key input signal is a key input signal for selecting a channel. The DMB accessory apparatus 100 has various methods of determining whether the received key input signal is the key input signal for selecting a channel. For example, if a numeric key is selected, the DMB accessory apparatus 100 may determine that the user selects a specific channel number.

If the DMB accessory apparatus 100 determines that the user has selected a key for selecting a channel as the determination result of step 412, in step 414, the DMB accessory apparatus 100 sets a channel corresponding to the key selected by the user into the DMB signal receiving unit 310. In step 416, the DMB accessory apparatus 100 receives only DMB data according to the channel set by the user In step 418, the DMB accessory apparatus 100 converts video data of the received DMB data, i.e., video data of the H.264 data format, into video data of the MPEG-4 data format according to the data format conversion set in step 406. After the data format of the video data is converted according to the set data format conversion, in step 420, the DMB accessory apparatus 100 transmits audio data and the converted video data to the mobile terminal 102. A data format of the audio data is not converted because the audio data converter 326 of the DMB accessory apparatus 100 does not have to convert the data format of the audio data in the case where the audio data of the DMB data has the AAC+ data format, since the mobile terminal 102, e.g., the mobile phone, can reproduce audio data of the AAC+ data format.

In step 422, the mobile terminal 102 reproduces the DMB data by decoding the received audio and video data and outputting the decoded audio and video data to the amplifier 354 and the display unit 356.

Thus, even a typical mobile terminal, which does not have the function of receiving and reproducing DMB data, can receive and reproduce DMB data using the DMB accessory apparatus 100 according to the present invention. Accordingly, the user can watch a DMB program anytime using the currently typical mobile terminal 102.

A representative accessory apparatus can be an external DMB antenna for improving a reception ratio of DMB data in a typical DMB receiving terminal. The external DMB antenna can be interfaced with the DMB receiving terminal by a user's selection according to a reception state of DMB data.

The external DMB antenna also can be interfaced with a terminal accessory interface of the DMB receiving terminal. The terminal accessory interface of the DMB receiving terminal also generally uses 10 terminals the same as illustrated in FIG. 2. Thus, the external DMB antenna can be interfaced with a typical mobile terminal other than the DMB receiving terminal.

However, the external DMB antenna has only the function of receiving DMB data and has neither a function of extracting multimedia data, broadcasting program information per channel, control data, and information data by analyzing the DMB data, nor a function of decoding the DMB data. In addition, the external DMB antenna has only an antenna function and does not have a host function for controlling a mobile terminal. Thus, only with the external DMB antenna, DMB data cannot be reproduced through a typical mobile terminal.

However, since the external DMB antenna has the function of receiving DMB data, i.e., the same function of the DMB signal receiving unit 310 of the DMB accessory apparatus 100 according to the present invention, and can be connected to the mobile terminal 102 through the terminal accessory interface 106, if the external DMB antenna includes the DMB accessory apparatus 100 according to the present invention, a user can watch a DMB program using a typical mobile terminal only with the external DMB antenna. Thus, the external DMB antenna in which the DMB accessory apparatus 100 according to the present invention is built is called a DMB accessory apparatus.

FIG. 5 is shows a plan view of a DMB accessory apparatus 600 according to another embodiment of the present invention.

Figure 5A:
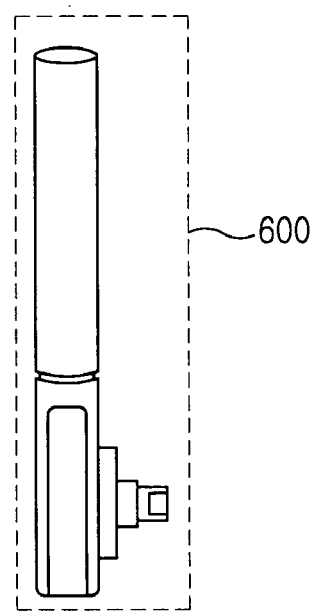
FIG. 5 is shows a plan view of a DMB accessory apparatus according to another embodiment of the present invention.
Figure 5B:
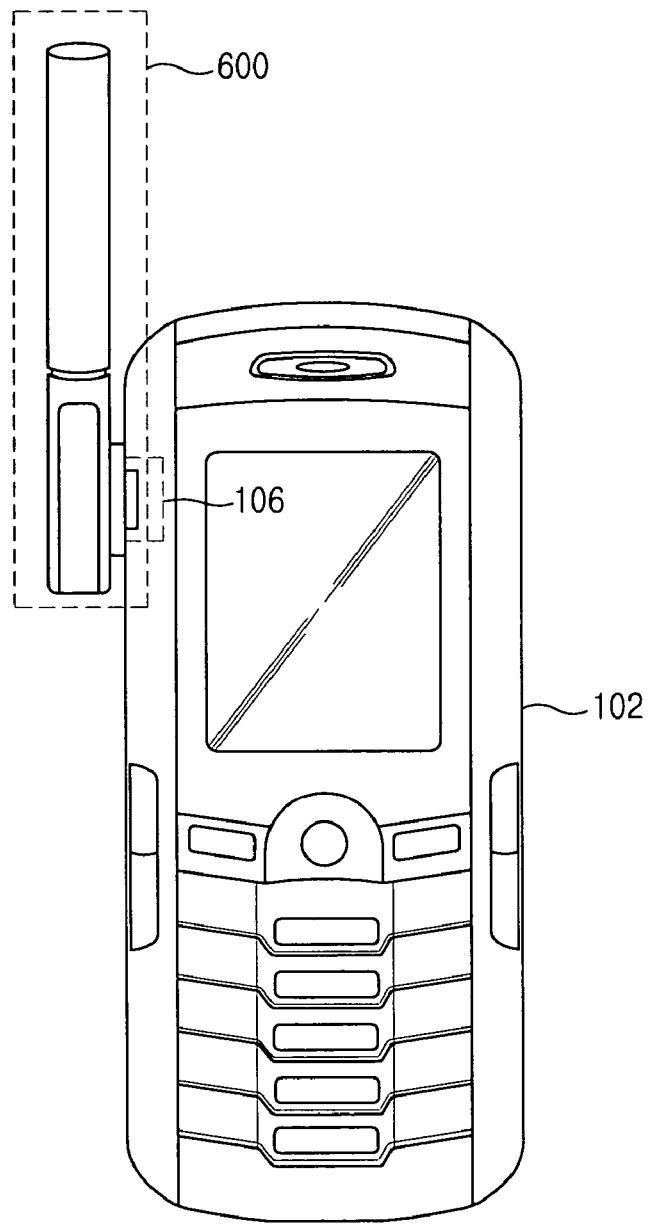

Referring to FIG. 5, FIG. 5A illustrates the DMB accessory apparatus 600. The DMB accessory apparatus 600 includes the components illustrated in FIG. 3A other than a typical external DMB antenna structure. The DMB accessory apparatus 600 is connected with the terminal accessory interface 106 using the same interface as the DMB accessory interface 104 of FIG. 3A. FIG. 5B shows an illustration of the DMB accessory apparatus 600 connected with the mobile terminal 102 through the terminal accessory interface 106.

Figure 6:
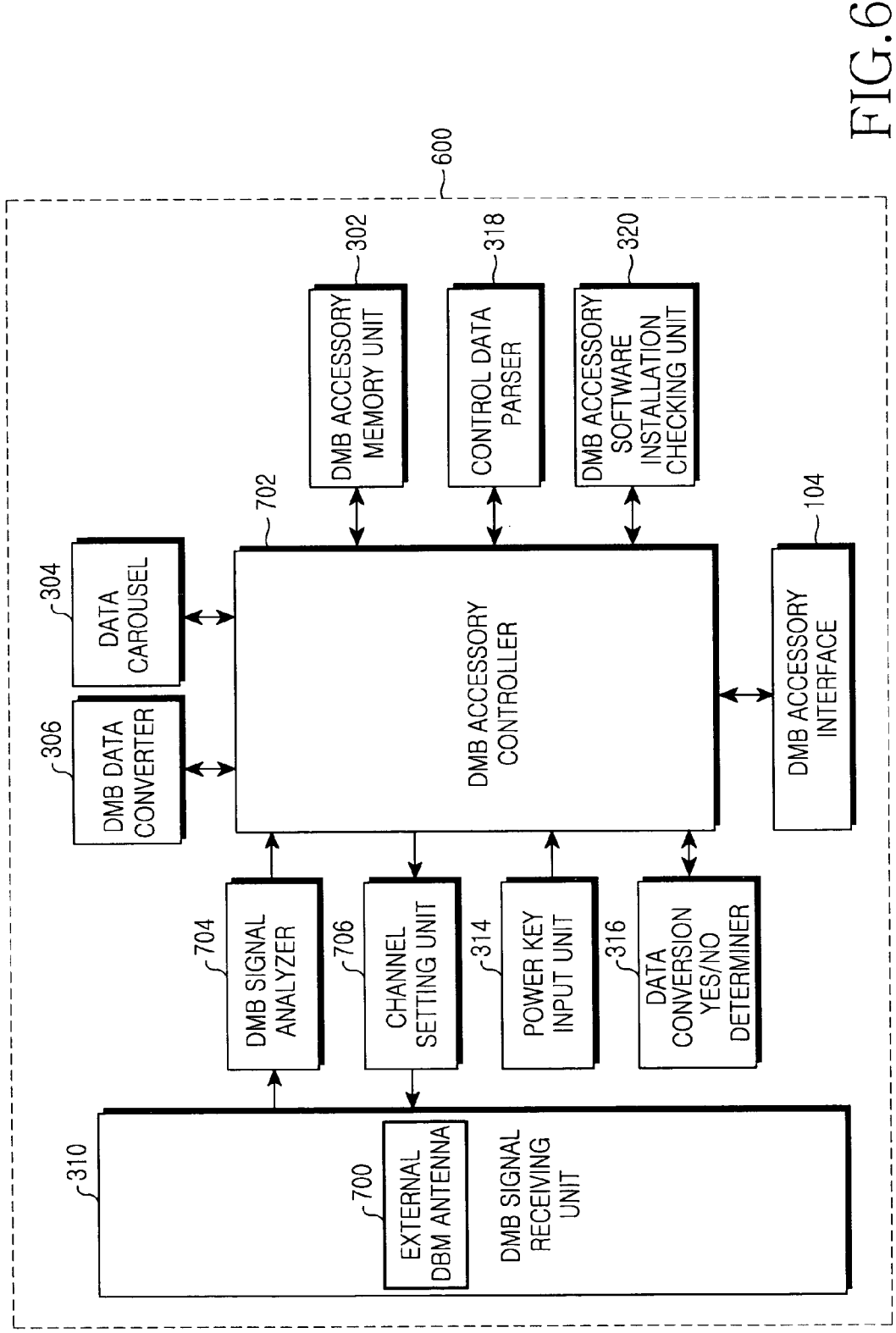
FIG. 6 is a block diagram of a DMB accessory apparatus according to another embodiment of the present invention.

FIG. 6 is a block diagram of the DMB accessory apparatus 600 according to another embodiment of the present invention. Referring to FIG. 6, the DMB accessory apparatus 600 includes an external DMB antenna 700 in the DMB signal-receiving unit 310 of FIG. 3A. Thus, according to the present invention, DMB data can be received using the external DMB antenna 700.

A DMB accessory controller 702 of the DMB accessory apparatus 600 receives DMB data from the DMB signal-receiving unit 310 through the external DMB antenna 700 and outputs the received DMB data to a DMB signal analyzer 704. The DMB signal analyzer 704 extracts multimedia data, information data, broadcasting program information per channel, and control data from the received DMB data and outputs the extracted data to the DMB accessory controller 702.

If a key input signal for setting a specific channel is input from the mobile terminal 102 through the DMB accessory interface 104, the DMB accessory controller 702 controls a channel setting unit 706 to set the channel corresponding to the key input signal into the DMB signal-receiving unit 310. Then, the DMB signal-receiving unit 310 receives only DMB data according to the set channel through the external DMB antenna 700 and transmits the received DMB data to the DMB signal analyzer 704.

Thus, the DMB accessory apparatus 600 according to the present invention can receive DMB data using the external DMB antenna 700 and allow the mobile terminal 102 to reproduce the received DMB data. Since the external DMB antenna 700 has a much better reception ratio than a general DMB signal receiving unit in an area in which a gap filler is not installed, the DMB accessory apparatus 600 according to the present invention including the external DMB antenna 700 also has a much better DMB reception ratio than the DMB accessory apparatus 100 according to the present invention.

Thus, the DMB accessory apparatus 600 allows a user to watch a DMB program through a typical mobile terminal with DMB quality that can be realized by an external DMB antenna-equipped DMB receiving terminal. Moreover, even in an area where the user cannot watch a DMB program without an external DMB antenna due to a worse reception state of DMB data, the DMB accessory apparatus 600 allows the user to watch the DMB program.

As described above, according to the embodiments of the present invention, even a mobile terminal, which does not have a function of receiving and reproducing DMB data, can reproduce the DMB data. Thus, even a user using a typical mobile terminal can watch a DMB program using an apparatus according to the present invention.

While the invention has been shown and described with reference to a certain preferred embodiment thereof, it will be understood by those skilled in the art that various changes in form and details may be made therein without departing from the spirit and scope of the invention. In particular, a DMB accessory apparatus confirms information on data conversion formats from a mobile terminal and converts video data and audio data of DMB data according to the information. However, if the mobile terminal can convert video data and audio data of various data formats, the DMB accessory apparatus can allow a user to select each one of the various video data formats and audio data formats through a setting menu provided by the mobile terminal.

In addition, the DMB accessory apparatus may include a Conditional Access System (CAS). The CAS is used to limit reception of a specific DMB channel through subscriber authentication for advanced DMB. For example, the CAS is used to provide an advanced DMB service, i.e., a premium service, to a user. In addition, the CAS may be used to limit specific users from watching DMB programs in area basis. Thus, if the DMB accessory apparatus includes the CAS, the DMB accessory apparatus also can provide the premium service or a regional reception limitation service to a user. Thus, the spirit and scope of the invention will be defined by the appended claims.

What is claimed is:

1. A digital multimedia broadcasting (DMB) accessory apparatus connectable to a mobile terminal, which decodes and reproduces input multimedia data of pre-set format, through an accessory interface of the mobile terminal, comprising:
    an interface, having a plurality of terminals for connection with the accessory interface of the mobile terminal;
    a DMB signal-receiving unit for receiving DMB data;
    a DMB signal analyzer for extracting multimedia data from the DMB data;
    a DMB accessory memory unit for storing conversion information used to convert data formats of the multimedia data into reproducible data formats by the mobile terminal;
    a data conversion yes/no determiner for requesting information on reproducible data formats from the mobile terminal, and determining the data formats used to convert the multimedia data based on the data format information received from the mobile terminal;
    a DMB data converter for converting the data formats of the multimedia data into data formats determined by the data conversion yes/no determiner; and
    a DMB accessory controller for transmitting the multimedia data to the mobile terminal if data formats of the multimedia data are reproducible data formats by the mobile terminal, and transmitting the multimedia data converted by the DMB data converter to the mobile terminal if data formats of the multimedia data are not reproducible data formats by the mobile terminal.

2. The DMB accessory apparatus of claim 1,
    wherein the DMB accessory controller applies a specific voltage to one of the terminals of the interface, which is not used to exchange data with the mobile terminal, and recognizes, by the mobile terminal, the DMB accessory apparatus as a host device.

3. The DMB accessory apparatus of claim 2, wherein the interface has ten terminals.

4. The DMB accessory apparatus of claim 2, wherein the DMB signal-receiving unit comprises an external DMB antenna to improve a reception ratio of the DMB data in an area where a gap filler is not installed.

5. The DMB accessory apparatus of claim 1, wherein the mobile terminal comprises:
    the accessory interface which is connectable to accessory interfaces including the DMB accessory apparatus;
    an interface controller for controlling interfacing between the accessory interface and the DMB accessory apparatus;
    a key input unit having a plurality of keys;
    a display unit for displaying image information;
    an audible sound output unit for outputting audible sound; and
    a terminal controller for determining logical states of the data terminals of the accessory interface and recognizing an apparatus connected through the accessory interface as a host device when the logical states of the data terminals are all high.

6. The DMB accessory apparatus of claim 5, wherein, when data is exchanged with the apparatus connected through the accessory interface, the mobile terminal uses only one of the data terminals of the accessory interface for the data exchange.

7. The apparatus of claim 6, wherein each of the accessory interface of the mobile terminal and the interface of the DMB accessory apparatus has at least ten terminals connectable with each other.

8. A method of receiving digital multimedia broadcasting (DMB) data using a DMB accessory apparatus connectable to a mobile terminal through an accessory interface of the mobile terminal, and reproducing the received DMB data through the mobile terminal, the method comprising the steps of:

applying, by the DMB accessory apparatus, a voltage through a pull up resistor to a terminal of an interface of the DMB accessory apparatus, which is not used to exchange data with the mobile terminal, said terminal being from a plurality of terminals that are connectable with terminals of the accessory interface of the mobile terminal;

converting, by the DMB accessory apparatus, the DMB data according to a multimedia data format which can be reproduced by the mobile terminal; and outputting, by the DMB accessory apparatus, the converted DMB data to the mobile terminal and for reproduction by the mobile terminal of the converted DMB data.

* * * * *